US006155486A

United States Patent [19]

Lutz

[11] Patent Number: 6,155,486

[45] Date of Patent: Dec. 5, 2000

[54] METHOD AND APPARATUS FOR OPERATING A SECURITY SYSTEM OF A SELF-SERVICE CHECKOUT TERMINAL

[75] Inventor: Dusty L. Lutz, Lawrenceville, Ga.

[73] Assignee: NCR Corporation, Dayton, Ohio

[21] Appl. No.: 09/245,588

[22] Filed: Feb. 8, 1999

[51] Int. Cl.[7] .............................. A47F 9/04; G06F 17/60

[52] U.S. Cl. ................. 235/383; 235/462.13; 235/462.3; 186/61

[58] Field of Search ................................. 235/22, 23, 20, 235/21; 186/61; 702/128, 129, 173, 175; 705/16, 23

[56] References Cited

U.S. PATENT DOCUMENTS

| | | | |
|---|---|---|---|
| 4,964,053 | 10/1990 | Humble | 364/466 |
| 5,115,888 | 5/1992 | Schneider | 186/61 |
| 5,139,100 | 8/1992 | Brauneis | 177/25.15 |
| 5,174,399 | 12/1992 | Brauneis | 177/25.15 |
| 5,398,191 | 3/1995 | Komai | 364/466 |
| 5,410,108 | 4/1995 | Williams et al. | 177/25.15 |
| 6,032,128 | 2/2000 | Morrison et al. | 705/23 |
| 6,056,087 | 5/2000 | Addy et al. | 186/61 |

*Primary Examiner*—Thien M. Le
*Assistant Examiner*—Uyen-Chau N. Le
*Attorney, Agent, or Firm*—Maginot, Addison & Moore

[57] ABSTRACT

A method of operating a self-service checkout terminal having a scanner device for allowing a user to enter an item for purchase, and a weight scale for detecting placement of the item for purchase in a post-scan area associated with the self-service checkout terminal includes the step of generating an item-entered control signal when the user scans the item for purchase with the scanner device. The method also includes the step of disabling the scanner device in response to generation of the item-entered control signal. Moreover, the method includes the step of generating an item-not-detected control signal if the weight scale does not detect placement of the item for purchase in the post-scan area within a first predetermined period of time subsequent to generation of the item-entered control signal. Yet further, the method includes the step of enabling the scanner device in response to generation of the item-not-detected control signal. A self-service checkout terminal is also disclosed.

19 Claims, 4 Drawing Sheets

METHOD AND APPARATUS FOR OPERATING A SECURITY SYSTEM OF A SELF-SERVICE CHECKOUT TERMINAL

TECHNICAL FIELD OF THE INVENTION

The present invention relates generally to a retail terminal, and more particularly to a method and apparatus for operating a security system of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her items for purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary security. Hence, self-service checkout terminals which have heretofore been designed typically include a security system which provides a level of security against theft or other improprieties.

One such security system which has been utilized in previously designed self-service checkout systems includes an item sensor such as a weight scale which is positioned to detect the insertion or removal of items into and out of a container such as a grocery bag. Heretofore, there have been two distinct approaches to the operation of such a security system (i.e. a security system including a weight scale). A first approach requires strict adhesion to the notion that every scanned or otherwise entered item must be placed in a grocery bag so as to be detected by the weight scale. Hence, when a customer scans or otherwise enters an item, the terminal is configured such that the customer is not allowed to perform any additional checkout functions (e.g. scan additional items) until the previously scanned item has been placed in a grocery bag. Such an approach has a number of drawbacks associated therewith. For example, such an approach may be inconvenient to the customer since the customer may not desire to place every item in a grocery bag. For instance, if the customer scans a pack of gum, the customer may desire to place the gum in his or her pocket instead of a grocery bag. Moreover, if the customer scans a relatively bulky item such as a fifty-pound bag of dog food, the customer may not desire (or be able to) place such an item in a grocery bag. Hence, in regard to such an approach, security from improprieties such as theft is enhanced, but ease of terminal operation by the customer may be reduced.

A second approach to operation of a security system having such a weight scale allows more flexibility in regard to item handling subsequent to entry thereof. For example, security systems have heretofore been designed which allow a customer to selectively place an entered item in a location other than a grocery bag (e.g. the customer's pocket). In particular regard to operation of such a security system, if the customer scans an item for purchase (e.g. a pack of gum), but does not place the gum in a grocery bag, a message is generated which reminds the customer to place the item in a bag. Thereafter, even if the customer still does not place the item (e.g. the gum) in a grocery bag, the customer's checkout transaction is allowed to continue. Hence, in regard to such an approach, ease of terminal operation may be enhanced, but security from improprieties such as theft may potentially be reduced.

What is needed therefore is a security system for use in a self-service checkout terminal which overcomes one or more of the above-mentioned drawbacks. What is particularly needed is a method and apparatus for operating a security system of a self-service checkout terminal which provides for enhanced security from improprieties such as theft along with enhanced ease of terminal operation by the customer.

SUMMARY OF THE INVENTION

In accordance with a first embodiment of the present invention, there is provided a method of operating a self-service checkout terminal. The method includes the step of generating an item-entered control signal when a user enters an item for purchase with a code entry device. The method also includes the step of disabling the code entry device in response to generation of the item-entered control signal. Moreover, the method includes the step of generating an item-not-detected control signal if the user does not place the item for purchase in the post-scan area within a first predetermined period of time subsequent to generation of the item-entered control signal. In addition, the method includes the step of enabling the code entry device in response to generation of the item-not-detected control signal.

In accordance with a second embodiment of the present invention, there is provided a method of operating a self-service checkout terminal having a scanner device for allowing a user to enter an item for purchase, and a weight scale for detecting placement of the item for purchase in a post-scan area associated with the self-service checkout terminal. The method includes the step of generating an item-entered control signal when the user scans the item for purchase with the scanner device. The method also includes the step of disabling the scanner device in response to generation of the item-entered control signal. Moreover, the method includes the step of generating an item-not-detected control signal if the weight scale does not detect placement of the item for purchase in the post-scan area within a first predetermined period of time subsequent to generation of the item-entered control signal. Yet further, the method includes the step of enabling the scanner device in response to generation of the item-not-detected control signal.

In accordance with a third embodiment of the present invention, there is provided a self-service checkout terminal. The self-service checkout terminal includes an entry device for allowing a user to enter an item for purchase. The self-service checkout terminal also includes an item sensor for detecting placement of the item for purchase in a post-scan area associated with the self-service checkout terminal. Moreover, self-service checkout terminal includes a processing unit electrically coupled to both the code entry device and the item sensor. Yet further, the self-service checkout terminal includes a memory device electrically coupled to the processing unit. The memory device has stored therein a plurality of instructions which, when executed by the processing unit, causes the processing unit to (a) generate an item-entered control signal when the user enters the item for purchase with the code entry device, (b) disable the code entry device in response to generation of the item-entered control signal, (c) generate an item-not-detected control signal if the item sensor does not detect placement of the item for purchase in the post-scan area within a first predetermined period of time subsequent to generation of the item-entered control signal, and (d) enable the code entry device in response to generation of the item-not-detected control signal.

It is therefore an object of the present invention to provide a new and useful method and apparatus of operating a self-service checkout terminal.

It is moreover an object of the present invention to provide an improved method and apparatus for operating a self-service checkout terminal.

It is yet further an object of the present invention to provide a method and apparatus for operating a security system of a self-service checkout terminal which provides for enhanced security from improprieties such as theft along with enhanced ease of terminal operation by the customer.

The above and other objects, features, and advantages of the present invention will become apparent from the following description and the attached drawings.

DETAILED DESCRIPTION OF THE INVENTION

Figure 1:
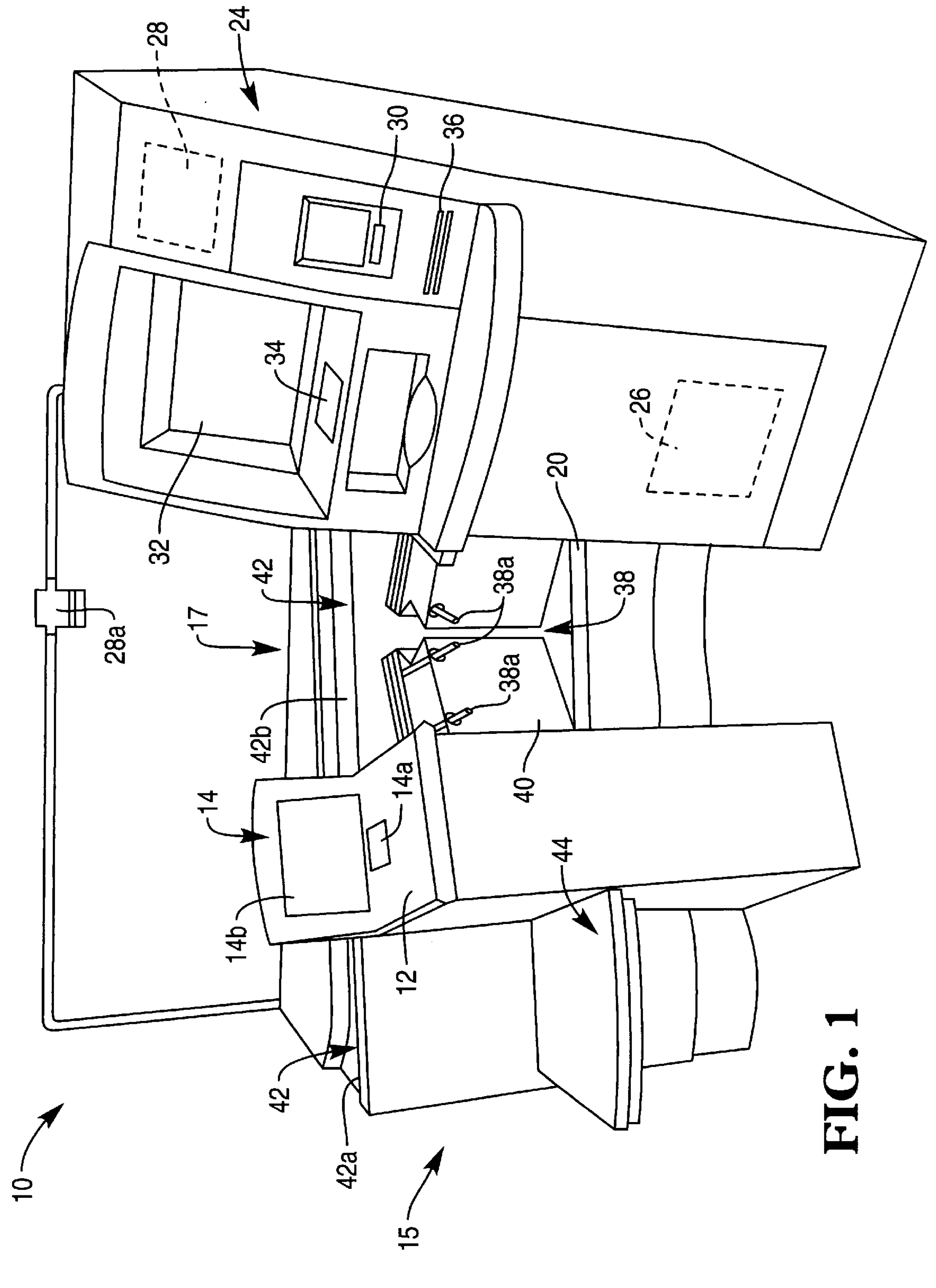
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
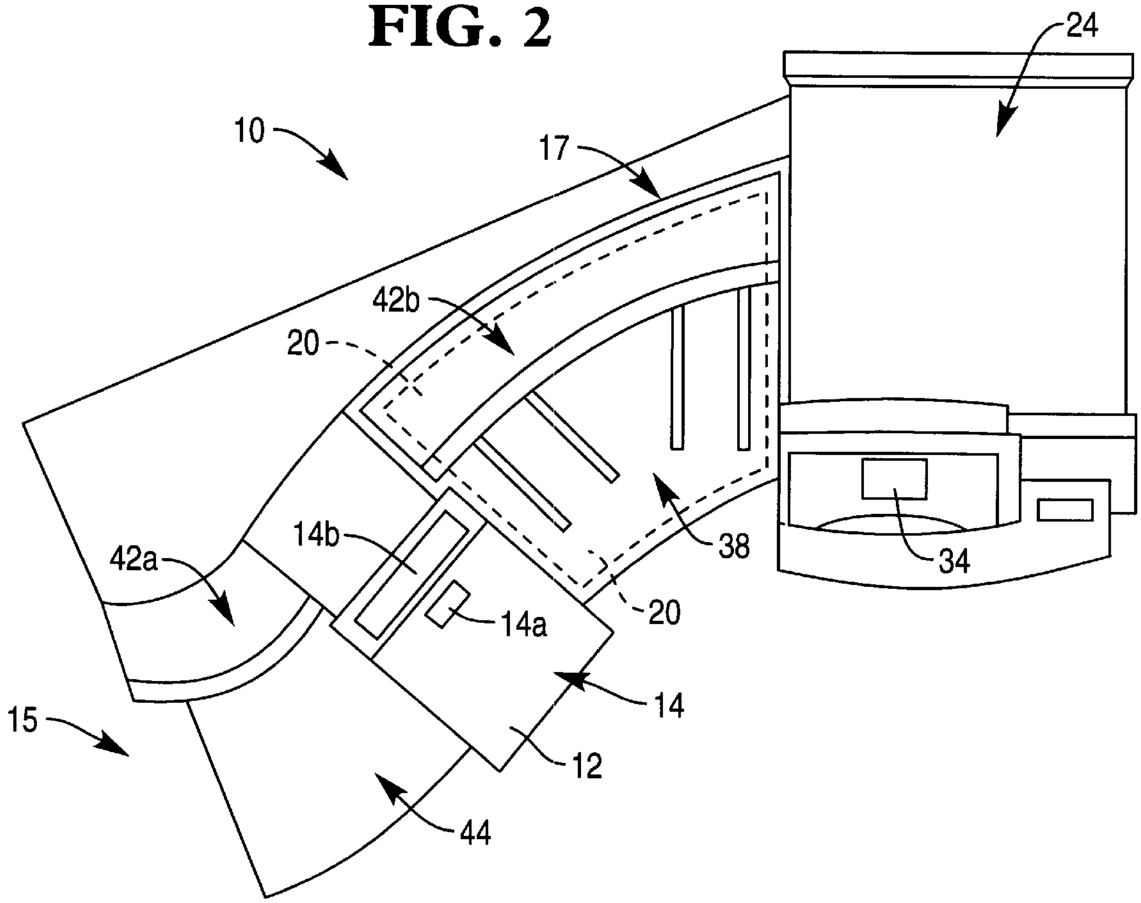
FIG. 2 is a plan view of the self-service checkout terminal of FIG. 1.

Referring now to FIGS. 1 and 2, there is shown a self-service checkout terminal 10 for use in a retail business such as a grocery store. The self-service checkout terminal 10 includes a product scale 12, a scanner 14, an item sensor such as a post-scan scale 20, an automated teller machine (ATM) 24, and a processing unit 26. The ATM 24 includes a video system 28, a card reader 30, a display monitor 32, a keypad 34, and a printer 36.

The self-service checkout terminal 10 also includes a bagwell 38 for accommodating one or more grocery containers or bags 40, a counter 42, and a basket shelf 44. The counter 42 defines an arcuate surface as shown in FIG. 2. Such an arcuate surface allows the counter 42 to be positioned relatively close to both the scanner 14 and the bagwell 38 thereby permitting the counter 42 to function as a "set-aside surface" for use by the user or customer during operation of the self-service checkout terminal 10. Such set-aside surfaces are necessary to allow the customer to selectively choose the order in which items are scanned or otherwise entered. Moreover, such set-aside surfaces are necessary to allow a customer to selectively choose the order in which items are loaded into the grocery bags 40. For example, if the customer scanned a loaf of bread, the customer may wait to load the bread into the grocery bag 40 until the bag is nearly full thereby preventing the bread from being crushed. As alluded to above, it may be desirable to use the set-aside surfaces both before and after an item has been scanned or otherwise entered. Hence, as shown in FIG. 2, the scanner 14 divides the counter 42 into a pre-scan set-aside shelf 42*a,* and a post-scan set-aside shelf 42*b*. In particular, the scanner 14 divides the counter 42 into the pre-scan set-aside shelf 42*a* which is upstream of the scanner 14, and the post-scan set-aside shelf 42*b* which is downstream from the scanner 14. The terms "upstream" and "downstream" are used to be consistent with the flow of items through the self-service checkout terminal 10 during a typical checkout procedure. In particular, an item enters at the area proximate the pre-scan set-aside shelf 42*a* then flows in a downstream direction to be scanned at the scanner 14 so as to enter a product identification code associated with the item. Once the product identification code associated with the item is entered, the item flows from the scanner 14 in a downstream direction to the post-scan set-aside shelf 42*b* or the bagwell 38.

The bagwell 38 is disposed between the scanner 14 and the ATM 24 as shown in FIG. 1. The bagwell 38 includes a number of posts 38*a* which cooperate to support a number of the grocery bags 40. The bagwell 38 is configured to allow two or more grocery bags 40 to be accessed by the customer at any given time. In particular, the posts 38*a* are of a sufficient length to secure a number of unopened grocery bags 40 along with two or more opened grocery bags 40 thereby allowing a customer to selectively load various item types into the grocery bags 40. For example, the customer may desire to use a first grocery bag 40 for household chemical items such as soap or bleach, and a second grocery bag 40 for edible items such as meat and produce.

The scanner 14 conventionally scans or reads a product identification code such as a Universal Product Code (UPC), industrial symbol(s), alphanumeric character(s), or other indicia associated with an item to be purchased. One scanner device which may be used as the scanner 14 of the present invention is a model number 7875 bi-optic scanner which is commercially available from NCR Corporation of Dayton, Ohio.

The scanner 14 includes a first scanning window 14*a* and a second scanning window 14*b*. The first scanning window 14*a* is disposed in a substantially horizontal manner, whereas the second scanning window 14*b* is disposed in a substantially vertical manner, as shown in FIG. 1. The product scale 12 is integrated with the scanner 14. More specifically, the product scale 12 is disposed substantially parallel to the scanning window 14*a* thereby enveloping the scanning window 14*a*. If an item such as produce is placed upon the product scale 12 or the first scanning window 14*a*, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The self-service checkout terminal 10 also includes a pre-scan area 15. What is meant herein by the term "pre-scan area" is the area associated with the self-service checkout terminal 10 in which items may be placed prior to being scanned or otherwise entered into the self-service checkout terminal 10. For example, the pre-scan area 15 includes the pre-scan set-aside shelf 42*a* and the basket shelf 44. Moreover, it should be appreciated that the pre-scan area 15 may also include the area proximate the terminal 10 in which a shopping cart is positioned prior to the unloading of items therefrom.

The post-scan scale 20 is positioned in order to determine the weight of an item or items positioned (1) on the post-scan set-aside shelf 42*b*, and/or (2) in the bagwell 38 (i.e. in one of the grocery bags 40). In particular, if a customer places an item on the post-scan set-aside shelf 42*b* or into one of the grocery bags 40, the post-scan scale 20 may be used to determine the weight of the item by detecting a weight increase associated with placement of the item on the post-scan set-aside shelf 42*b* or into one of the grocery bags 40. Alternatively, if a customer removes an item from the post-scan set-aside shelf 42*b* or one of the grocery bags 40, the post-scan scale 20 may be used to determine the weight of the item by detecting a weight decrease associated with removal of the item from the post-scan set-aside shelf 42*b* or one of the grocery bags 40. The post-scan scale 20 may be embodied as any known retail weight scale. One such retail weight scale which is particularly useful as the post-scan scale 20 of the present invention is a model number 6680 weight scale which is commercially available from Weigh-Tronix, Incorporated of Santa Rosa, Calif.

From the above discussion, it should be appreciated that the post-scan scale 20 monitors placement of items into, and removal of items from, a post-scan area 17 associated with the self-service checkout terminal 10. What is meant herein by the term "post-scan area" is the area associated with the self-service checkout terminal 10 in which items may be placed subsequent to being scanned or otherwise entered into the self-service checkout terminal 10. For example, the post-scan area 17 includes the post-scan set-aside shelf 42*b* and the bagwell 38 (including the grocery bags 40 therein).

It should be further appreciated that the post-scan scale 20 may be used to monitor movement or shuffling of items within the post-scan area 17. In particular, the post-scan scale 20 may be used to monitor movement of items onto and off of a number of post-scan surfaces within the post-scan area 17. What is meant herein by the term "post-scan surface" is any surface within the post-scan area on which an item may be positioned after being scanned or otherwise entered into the self-surface checkout terminal 10. An example of a post-scan surface would include the post-scan set-aside shelf 42*b* and the base of the bagwell 38 on which the grocery bags 40 are positioned. Hence, the post-scan scale 20 may be used to monitor movement of items which had been previously set-aside on the post-scan set-aside shelf 42*b* and thereafter either placed into one of the grocery bags 40 or removed permanently from the self-service checkout terminal 10 (e.g. placed in the customer's pocket). For instance, the post-scan scale 20 may be used to first determine that an item has been removed from the post-scan set-aside shelf 42*b* by detecting a weight decrease associated with removal of the item. Thereafter, the post-scan scale 20 may be used to determine if the item is then placed into one of the grocery bags 40 by detecting a weight increase associated with placement of the item into one of the grocery bags 40.

The display monitor 32 displays instructions which serve to guide a customer through a checkout procedure. For example, an instruction is displayed on the display monitor 32 which instructs the customer to remove an item from a grocery cart and enter the item into the self-service checkout terminal 10 by passing the item over the scanner 14, or placing the item on the product scale 12 in order to obtain the weight of the item. Moreover, as shall be discussed below in more detail, the display monitor 32 may be utilized to display an instruction which instructs the customer to place an item which has been scanned in the post-scan area 17 of the self-service checkout terminal 10. The display monitor 32 may be a known touch screen monitor which can generate data signals when certain areas of the screen are touched by a customer.

Figure 3:
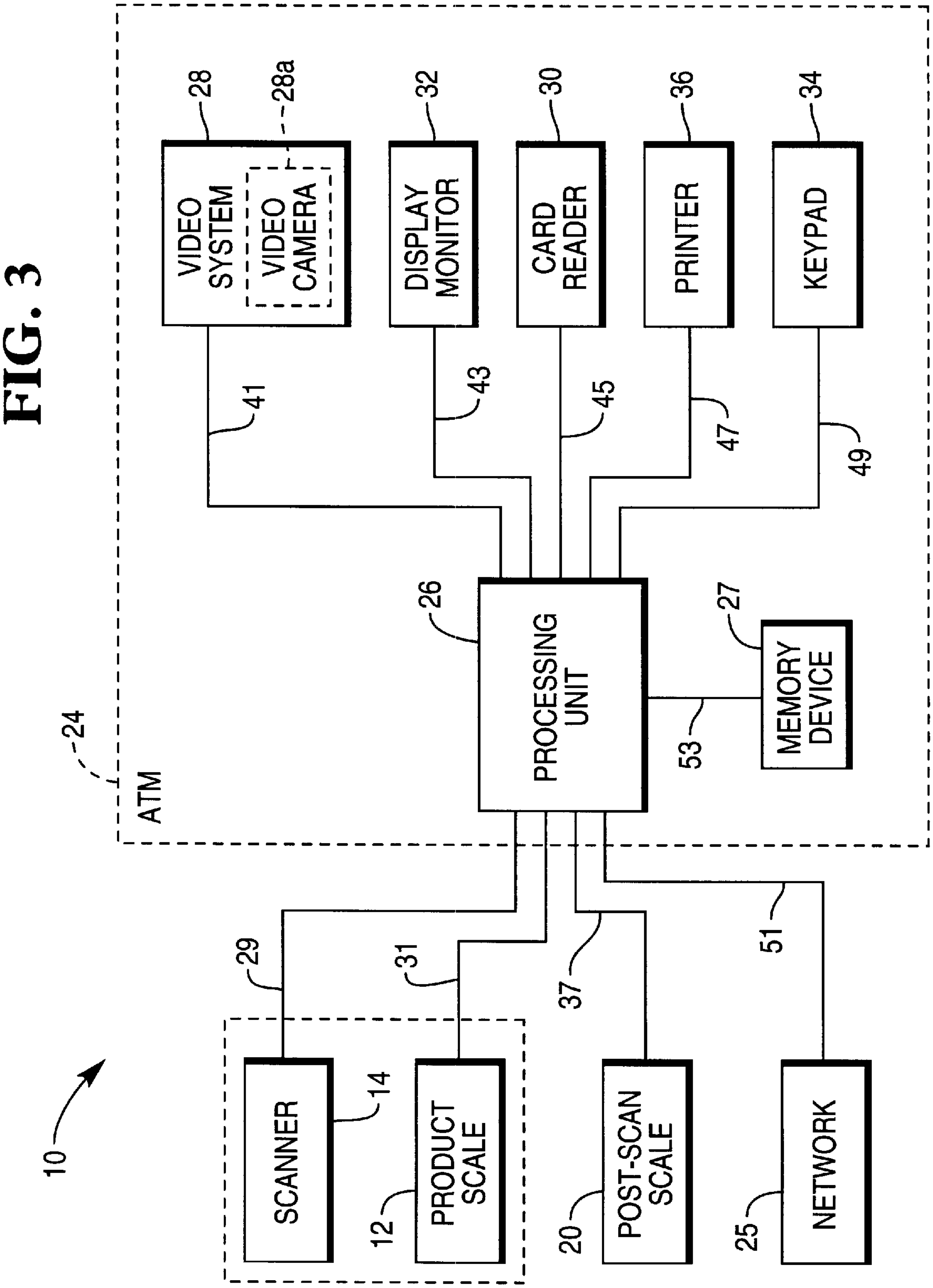
FIG. 3 is a simplified block diagram of the self-service checkout terminal of FIG. 1.

Referring now to FIG. 3, there is shown a simplified block diagram of the self-service checkout terminal 10. The processing unit 26 is electrically coupled to the product scale 12, the scanner 14, the post-scan scale 20, the video system 28, the card reader 30, the display monitor 32, the keypad 34, and the printer 36. The processing unit 26 is also electrically coupled to a network 25 and a memory device 27 as shown in FIG. 3.

The processing unit 26 monitors output signals generated by the scanner 14 via a communication line 29. In particular, when the customer of the self-service checkout terminal 10 scans an item which includes a bar code across the scanning windows 14*a*, 14*b*, an output signal is generated on the communication line 29 indicative of the product identification code associated with the item.

The processing unit 26 is coupled to the product scale 12 via a data communication line 31. In particular, when an item is placed on the product scale 12, the product scale 12 generates an output signal on the data communication line 31 indicative of the weight of the item.

The processing unit 26 is coupled to the post-scan scale 20 via a data communication line 37. In particular, when an item is placed on the post-scan set-aside shelf 42*b* or into one of the grocery bags 40, the post-scan scale 20 generates an output signal on the data communication line 37 indicative of the weight increase associated with placement of the item. Similarly, when an item is removed from the post-scan set-aside shelf 42*b* or one of the grocery bags 40, the post-scan scale 20 generates an output signal on the data communication line 37 indicative of the weight decrease associated with removal of the item.

The processing unit 26 communicates with the video system 28 via a communication line 41. The video system 28 includes a video camera 28*a* (see also FIG. 1), and is included in the self-service checkout terminal 10 to enhance the security thereof. The video system 28 may be a known closed-circuit video system which displays video images on a portion of the display monitor 32 relating to certain events during a customer's transaction.

The processing unit 26 communicates with the display monitor 32 through a data communication line 43. The processing unit 26 generates output signals on the data communication line 43 which cause various instructional messages to be displayed on the display monitor 32. As discussed above, the display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, the instructional messages may be generated with a voice generating device (not shown) or an audible tone generating device (not shown).

The keypad 34 is coupled to the processing unit 26 through a data communication line 49. The keypad 34 may include one or more of a known keypad or a touch pad. The keypad 34 and touch screen associated with the display monitor 32 may be utilized to manually enter a product identification code associated with an item for purchase. Hence, the scanner 14, the keypad 34, and the display monitor 32 define code entry devices which may be utilized to input the product identification code associated with an item thereby causing the item to be entered into the self-service checkout terminal 10. It should be appreciated that numerous other types of devices may also be utilized as code entry devices in order to fit the needs of a given self-service checkout terminal 10.

In addition, the processing unit 26 is coupled to the printer 36 via a data communication line 47. The printer 36 may be used to print a receipt at the end of a given checkout procedure. Moreover, the card reader 30 is coupled to the processing unit through a data communication line 45. The card reader 30 may include a known credit and/or debit card reader, or a smart card reader.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to obtain information such as pricing information on an item being scanned or weighed, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain an electronic transaction table which includes a record of the product information associated with each item that is scanned, weighed, or otherwise entered during the customer's use of the self-service checkout terminal 10. For example, if the customer scans a can of soup, the description of the soup and the pricing information associated therewith is recorded in the transaction table in the memory device 27. Similarly, if the customer weighs a watermelon with the product scale 12 and then enters a product lookup code associated with watermelon via the keypad 34, product information associated with the watermelon is recorded in the transaction table. Moreover, if a customer entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the printer 36 thereby generating a receipt for the customer at the end of his or her transaction.

In operation, the processing unit 26 controls the various components associated with the self-service checkout terminal 10 in order to facilitate a customer's operation of the terminal 10 along with providing a level of security from improprieties such as theft. For example, as shall be discussed below in more detail, during operation of the self-service checkout terminal 10, the terminal 10 executes a security application which operates the terminal 10 in a manner which enhances the security from improprieties such as theft while also enhancing ease of terminal operation by the customer. In particular, when a customer scans or otherwise enters an item for purchase, the security application operates the self-service checkout terminal 10 so as to "encourage" the customer to immediately place the entered item in the post-scan area 17. More specifically, operation of the security application in regard to prevention of improprieties such as theft is enhanced if items are entered and placed in the post-scan area 17 (e.g. into one of the grocery bags 40) in sequential order (e.g. a first item is scanned, the first item is placed in a grocery bag 40, a second item in scanned, the second item is placed in the bag, etc.). This is true since such sequential placement of items allows the security application to associate a specific weight value with each item that is scanned or otherwise entered. For example, such association of a weight value is particularly useful in the case of monitoring the removal of a voided item from the post-scan area 17. In particular, if the security application associates a weight value to a given entered item, the security application may monitor the weight value of the item when it is removed from the post-scan area 17 if the item is subsequently voided from the transaction so as to verify that the proper item is removed. The security application is also configured to allow the customer opt out of placing his or her items in the post-scan area 17, if so desired. This is particularly useful in the case of where the customer scans an item that he or she does not desire to place in the post-scan area 17. For example, if the customer scans a pack of gum, the customer may opt to place the gum in his or her pocket instead of the post-scan area 17.

Hence, once a customer scans or otherwise enters an item, the processing unit 26 starts a timer which monitors the amount of time which has lapsed since the customer entered the item. Moreover, once the customer has entered the item, the processing unit 26 disables the scanner 14 and any other code entry device associated with the self-service checkout terminal 10 (e.g. the keypad 34 or the touch screen associated with the display monitor 32) so as to prevent entry of additional items. What is meant herein by the terms “disable”, “disables”, “disabling”, or “disabled” is that output signals from a device associated with the self-service checkout terminal 10 (e.g. the scanner 14 or any other code entry device) are not utilized or otherwise processed by the processing unit 26 for the purpose of entering additional product identification codes. Conversely, what is meant herein by the terms “enable”, “enables”, or “enabling” is that output signals from a device associated with the self-service checkout terminal 10 (e.g. the scanner 14 or any other code entry device) are utilized or otherwise processed by the processing unit 26 for the purpose of entering additional product identification codes.

It should be appreciated that a device may be disabled in a number of different manners. For example, the processing unit 26 may communicate with the device in order to render the device inoperable, or may alternatively allow the device to operate normally, but ignore output therefrom. For instance, in the case of the scanner 14, the processing unit 26 may disable the scanner 14 by communicating with the scanner 14 so as to prevent the scanner 14 from attempting to scan product identification codes (i.e. preventing light signals from being generated by the scanner 14), or may alternatively allow the scanner 14 to operate normally, but ignore any output signals generated by the scanner 14.

Once the post-scan scale 20 has detected a weight increase associated with the customer placing the entered item in the post-scan area 17 (e.g. placement of the entered item in a grocery bag 40 or onto the post-scan set-aside shelf 42*b*), the processing unit 26 enables the scanner 14 and any other code entry device so as to allow entry of subsequent items. However, if a predetermined period of time such as three seconds lapses and the customer has not yet placed the entered item in the post-scan area 17 (as detected by the post-scan scale 20), a message is generated which instructs the customer to place the item in the post-scan area 17. Such a message may be displayed on the display monitor 32 or a voice recording may be played on an audio device or the like (not shown).

If another predetermined period of time lapses such as an additional three seconds (i.e. six seconds since the item was entered) and the customer has not yet placed the entered item in the post-scan area 17 (as detected by the post-scan scale 20), the processing unit 26 concludes that the customer does not intend to place the entered item in a grocery bag 40 (e.g. the entered item may be a pack of gum which the customer desires to place in his or her pocket). Once the processing unit 26 concludes that the customer is not going to place the item in the post-scan area 17, the processing unit 26 enables the scanner 14 and any other code entry device so as to allow entry of subsequent items. However, as a security measure, the processing unit 26 makes a record of the event (i.e. the fact that an item was entered but not placed in the post-scan area 17) in an electronic security log which, as described below, may be utilized by the security application to determine if the customer's transaction needs to be audited or otherwise investigated. However, it should be appreciated that if the customer subsequently places the item in the post-scan area 17 before performing a subsequent step associated with his or her checkout transaction (e.g. scanning a subsequent item or tendering payment), the self-service checkout terminal 10 may be configured such that a record is not made in the electronic security log.

Figure 4:
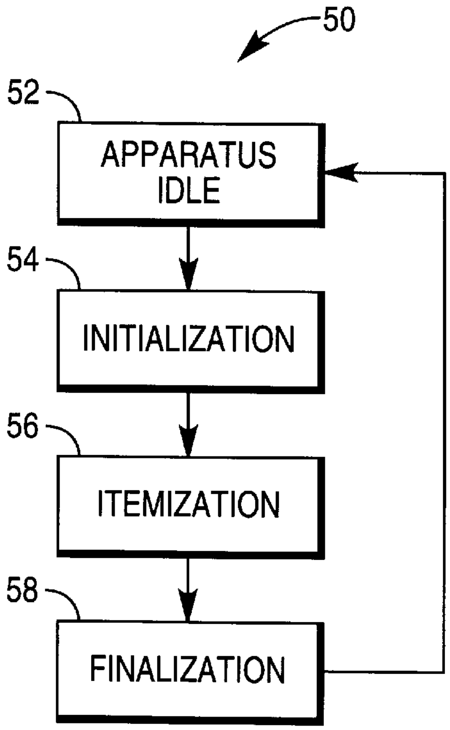
FIG. 4 is a flowchart setting forth a general procedure for checking out items through the self-service checkout terminal of FIG. 1.

Referring now to FIG. 4, there is shown a flowchart which sets forth a general procedure 50 for checking out items through the self-service checkout terminal 10. It should be appreciated that when the customer arrives at the self-service checkout terminal 10, the terminal 10 is in an idle state (step 52). An initialization step 54 is executed prior to checking out items for purchase. In particular, one or more initialization instructions are displayed on the display monitor 32 which instruct the customer to (1) touch a particular area of the display monitor 32 or push a particular button on the keypad 34 in order to select a desired method of payment, and/or (2) identify himself or herself by inserting a loyalty card, debit card, credit card, or smart card into the card reader 30.

At the completion of the initialization step 54, the routine 50 advances to an itemization step 56 where the customer enters individual items for purchase by scanning the items across the scanner 14. Moreover, in step 56, the customer may enter items, such as produce items or the like, by weighing the items with the product scale 12, and thereafter entering a product lookup code associated with the item via either the keypad 34 or by touching a particular area of the display monitor 32. Further, in step 56 the customer may enter an item by manually entering the product identification code associated with the item via use of the keypad 34. Such manual entry of an item may be necessary for items (which would otherwise be entered via the scanner 14) if the product identification code printed on the item is not readable by the scanner 14 or if the item is too large or bulky to be scanned with the scanner 14. It should be appreciated that the self-service checkout terminal 10 may be configured such that the routine 50 allows experienced customers to bypass the initialization step 52 thereby advancing directly to the itemization step 56. In such a configuration, the experienced customer would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card or debit card account, or decreasing a value amount stored on a smart card via the card reader 30. It should be appreciated that in the case of when a customer inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent customer initiates a checkout procedure.

Figure 5:
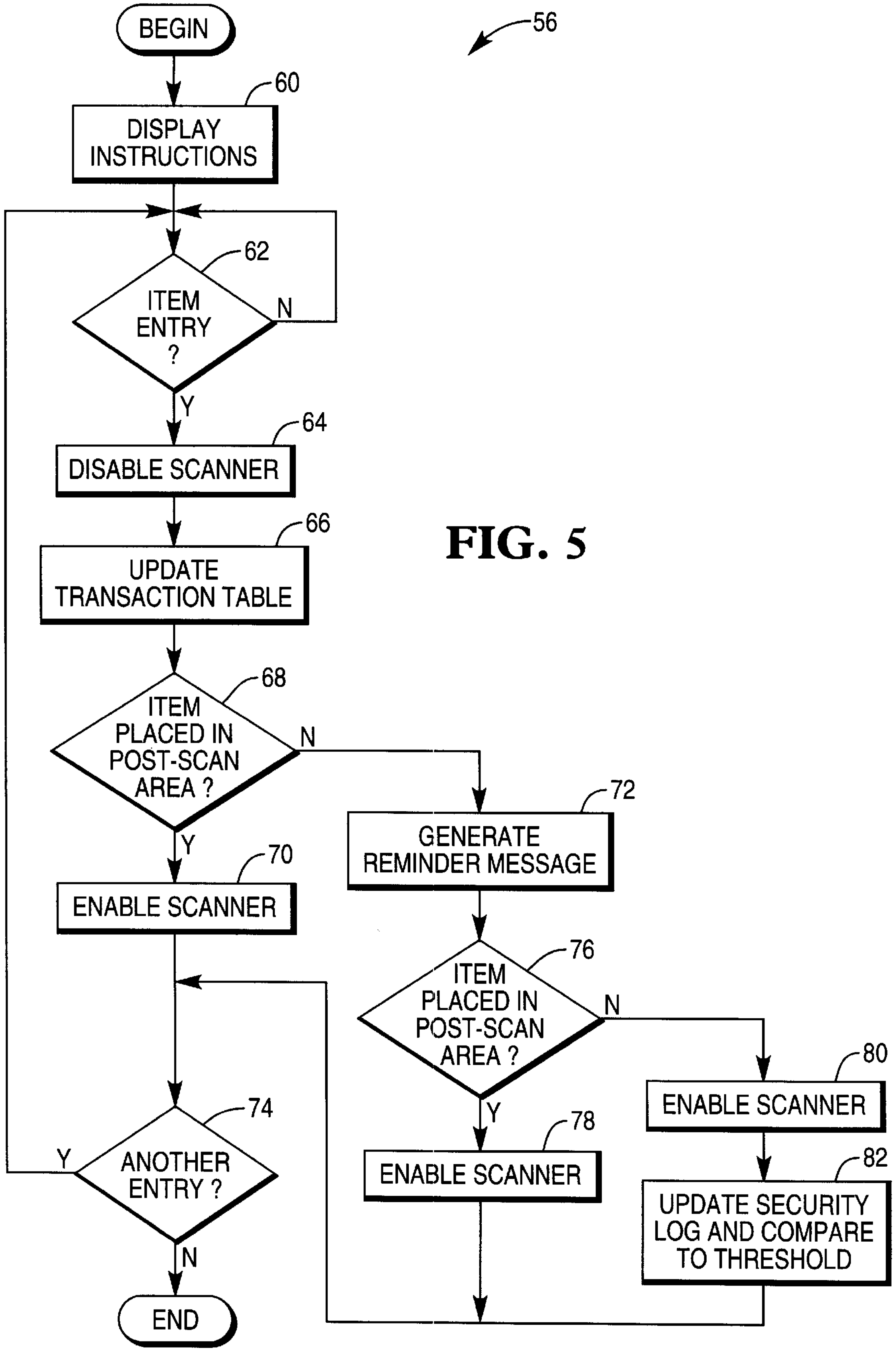
FIG. 5 is a flowchart setting forth in more detail the itemization step of the general procedure of FIG. 4.

Referring now to FIG. 5, there is shown a flowchart setting forth the itemization step 56 in greater detail. After the initialization step 54 (see FIG. 4) is completed, the routine 56 advances to step 60 in which a message is displayed on the display monitor 32 which instructs the customer to enter an item by either (1) passing or otherwise scanning individual items across or adjacent the scanner 14 with the item's product identification code facing the scanning windows 14*a*, 14*b*, (2) placing an individual item on the product scale 12 in order to be weighed, or (3) manually entering the product identification code associated with an item with the keypad 34 or the touch screen associated with the display monitor 32. The routine 56 then advances to step 62.

In step 62, the processing unit 26 determines whether an item has been entered into the self-service checkout terminal 10. In particular, the processing unit 26 determines if (1) the scanner 14 has successfully read or otherwise captured the product identification code associated with an item, (2) the product identification code associated with an item has been entered via the touch screen portion of the display monitor 32, or (3) the product identification code associated with an item has been entered via the keypad 34. More specifically, the scanner 14 generates an output signal which is sent to the processing unit 26 once the scanner 14 successfully reads the product identification code associated with the item. Similarly, the display monitor 32 and the keypad 34 generate an output signal which is sent to the processing unit 26 once the product identification code has been entered by the customer. If an item is successfully entered into the self-service checkout terminal 10, an item-entered control signal is generated and the routine 56 advances to step 64. If an item is not successfully entered into the self-service checkout terminal 10, the item-entered control signal is not generated, and the routine 56 loops back to monitor subsequent entry of an item.

In step 64, the processing unit 26 disables the scanner 14 and any other item entry device associated with the self-service checkout terminal 10. As described above, the scanner 14 may be disabled in a number of different manners. For example, the processing unit 26 may disable the scanner 14 by communicating with the scanner 14 so as to prevent the scanner 14 from attempting to scan additional product identification codes (i.e. preventing light signals from being generated by the scanner 14). Alternatively, the processing unit 26 may allow the scanner 14 to operate normally, but ignore any output signals generated by the scanner 14. Once the scanner 14 has been disabled, the routine 56 advances to step 66.

In step 66, the processing unit 26 adds a record of the item entered in step 62 to the transaction table. In particular, the processing unit 26 communicates with the network 25 to obtain product information (e.g. description and price) associated with the entered item from a master product database. Thereafter, the processing unit 26 updates the transaction table. More specifically, the processing unit 26 generates an output signal which causes the transaction table to be updated to include the product information associated with the entered item. It should be appreciated that the contents of the transaction table are used by the self-service checkout terminal 10 for purposes of generating a grocery bill and receipt at the end of the transaction. The routine 56 then advances to step 68.

In step 68, the processing unit 26 determines if the entered item is placed into the post-scan area 17 of the self-service checkout terminal 10. More specifically, the post-scan scale 20 generates an output signal which is sent to the processing unit 26 once the post-scan scale 20 has detected the customer placing the entered item into one of the grocery bags 40. Moreover, the customer may opt not to immediately place the entered item into one of the grocery bags 40. For example, if the customer scanned a loaf of bread, the customer may wait to place the bread into one of the grocery bags 40 until it is nearly full thereby preventing the bread from being crushed. Hence, in step 68 the post-scan scale 20 generates an output signal which is sent to the processing unit 26 once the post-scan scale 20 has detected a customer placing the entered item onto the post-scan shelf 42*b*. Therefore, if the customer places the entered item in the post-scan area 17 (i.e. into one of the grocery bags 40 or onto the post-scan set-aside shelf 42*b*), an item-detected control signal is generated and the routine 56 advances to step 70. However, if the customer does not place the entered item in the post-scan area 17 within a predetermined period of time (e.g. within three seconds of entering the item), a reminder-needed control signal is generated and the routine 56 advances to step 72.

In step 70, the processing unit 26 enables the scanner 14. In particular, since the customer placed the entered item in the post-scan area 17 (as detected in step 68), the processing unit 26 communicates with the scanner 14 in order to enable the scanner 14 thereby allowing the scanner 14 to be utilized to scan subsequent product identification codes and therefore generate output signals on the signal line 29 indicative of the same. Once the scanner 14 has been enabled, the routine 56 advances to step 74.

In step 74, the processing unit 26 monitors output from the keypad 34 and the display monitor 32 in order to determine whether there are more items to be entered. In particular, a message is displayed on the display monitor 32 instructing the customer to touch a particular touch screen area of the display monitor 32, or to touch a particular key associated with the keypad 34, when the customer has completed entering all of his or her items for purchase.

If a particular output is detected from either the keypad 34 or the display monitor 32, the processing unit 26 determines that the itemization step 56 is complete and the routine 56 then ends thereby advancing the routine 50 (see FIG. 4) to the finalization step 58 in order to allow the customer to tender payment for his or her items for purchase. If a particular output is not detected from either the keypad 34 or the display monitor 32, the processing unit 26 determines that the customer has additional items for purchase to be entered, and the routine 56 loops back to step 62 to monitor entry of subsequent items.

Returning now to step 68, if the customer does not place the entered item in the post-scan area 17 within a predetermined period of time (e.g. within three seconds of entering the item), a reminder-needed control signal is generated and the routine 56 advances to step 72. In step 72, a message is displayed on the display monitor 32 which reminds or otherwise instructs the customer to place the entered in item in the post-scan area 17 by either placing the item in one of the grocery bags 40 or setting the item down on the post-scan set-aside shelf 42*b* for subsequent bagging thereof. In lieu of or in addition to displaying the reminder message on the display monitor 32, it should be noted that such a reminder message may be provided by playing a voice recording with an audio device or the like (not shown). It should be appreciated that such a reminder message encourages the customer to place items in the post-scan area 17 immediately after entry of the item thereby allowing the security application to determine the location of the entered item. The routine 56 then advances to step 76.

In step 76, the processing unit 26 determines if the entered item has been placed into the post-scan area 17 of the self-service checkout terminal 10 in response to the reminder message generated in step 72. More specifically, as described above, the post-scan scale 20 generates an output signal which is sent to the processing unit 26 once the post-scan scale 20 has detected the customer placing the entered item into one of the grocery bags 40 or onto the post-scan shelf 42*b*. Therefore, if the customer places the entered item in the post-scan area 17 (i.e. into one of the grocery bags 40 or onto the post-scan set-aside shelf 42*b*), an item-detected control signal is generated and the routine 56 advances to step 78. However, if the customer does not place the entered item in the post-scan area 17 within a predetermined period of time (e.g. within three seconds subsequent to generation of the reminder message, or in another words, within six seconds of entry of the item), an item-not-detected control signal is generated and the routine 56 advances to step 80.

In step 78, the processing unit 26 enables the scanner 14. In particular, since the customer placed the entered item in the post-scan area 17 (as detected in step 76), the processing unit 26 communicates with the scanner 14 in order to enable the scanner 14 thereby allowing the scanner 14 to be utilized to scan subsequent product identification codes and therefore generate output signals on the signal line 29 indicative of the same. Once the scanner 14 has been enabled, the routine 56 advances to step 74 in order to determine if the customer has additional items to enter in the manner previously discussed.

Returning now to step 76, if the customer does not place the entered item in the post-scan area 17 within a predetermined period of time (e.g. within three seconds subsequent to generation of the reminder message, or in another words, within six seconds of entry of the item), an item-not-detected control signal is generated and the routine 56 advances to step 80. In step 80, the processing unit 26 enables the scanner 14. In particular, the processing unit 26 concludes that the customer does not desire to place the item in either one of the grocery bags 40 or onto the post-scan set-aside shelf **42*b* since the customer has not placed the entered item in the post-scan area 17 within the predetermined period of time (e.g. within six seconds of entering the item) despite the reminder message generated in step 72. As discussed above, the customer may have entered an item such as a pack of gum or a greeting card that the customer does not desire to place in the post-scan area 17. Moreover, the customer may have entered an item which is too big or bulky (e.g. a fifty-pound bag of dog food) to place in the post-scan area 17. Therefore, in step 80, even though the customer did not place the item in the post-scan area 17, the processing unit 26 communicates with the scanner 14 in order to enable the scanner 14 thereby allowing the scanner 14 to be utilized to scan subsequent product identification codes and therefore generate output signals on the signal line 29 indicative of the same. Once the scanner 14 has been enabled, the routine 56 advances to step 82**.

In step 82, although the security application allows the customer's checkout transaction to continue even though the customer did not place the entered item in the post-scan area 17, the processing unit 26 does track the number of occasions in which the customer opts out of placing the item in post-scan are 17 in order to determine if the customer is placing an excessive number of entered items outside of the post-scan area 17. Hence, in step 82, the processing unit 26 increments an electronic security log value. More specifically, the processing unit 26 generates an output signal which causes an electronic security log value maintained in the memory device 27 to be incremented by a value of one. It should be appreciated that such an electronic security log may also have entries made therein based on other behavioral patterns of the customer such as placing items in a grocery bag 40 which have not been entered or other types of inadvertent or intentional security breaches. Moreover, as described above, it should be further appreciated that if the customer subsequently places the item in the post-scan area 17 before performing a subsequent step associated with his or her checkout transaction (e.g. scanning a subsequent item or tendering payment), the self-service checkout terminal 10 may be configured such that a record is not made in the electronic security log.

Thereafter, the processing unit 26 determines if the updated log value has a predetermined relationship with a log threshold value. More specifically, if the updated log value exceeds a predetermined log threshold value, the processing unit 26 causes an intervention-needed control signal to be generated which in turn pages or otherwise summons retail personnel such as a customer service manager or other security personnel in order to audit or otherwise investigate the customer's transaction. It should be appreciated that retail personnel may be summoned via use of a summoning device such as a paging network or a signal lamp. The routine 56 then advances to step 74 in order to determine if the customer has additional items to enter in the manner previously discussed.

Hence as described herein, the self-service checkout terminal 10 of the present invention provides numerous advantages over terminals which have heretofore been designed. For example, the self-service checkout terminal of the present invention provides for enhanced security from improprieties such as theft along with enhanced ease of terminal operation by the customer. For example, by operating the terminal 10 so as to disable the scanner 14 once an item has been entered, the customer is "encouraged" to place the item in the post-scan area immediately after entry of the item. Moreover, generation of the reminder message after a predetermined period of time also "encourages" the customer to place the item in the post-scan area 17. However, terminal ease of use is enhanced since the scanner 14 is enabled after a predetermined period of time even if the customer does not place the item in the post-scan area 17 thereby allowing the customer to place an item in his or her pocket or the like subsequent to entry thereof.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, it should be appreciated that the duration of the period of time between item entry and generation of the reminder message (exemplified above as three seconds) may be configured to any duration which fits the needs of a given retailer. Similarly, the duration of the period of time before the processing unit 26 concludes that the customer is not going to place the item in the post-scan area 17 (exemplified above as six seconds, or in other words, three seconds subsequent to generation of the reminder message) may also be configured to fit the needs of a given retailer. Moreover, any number of reminder messages may be generated between item entry and the point in time at which the processing unit 26 concludes that the customer is not going to place the item in the post-scan area 17.

Moreover, an exceptions database may be maintained in the memory device 27 that contains a list of specific items or item types which are likely not to be placed in a grocery bag. If an item contained in the exceptions database is scanned or otherwise entered into the self-service checkout terminal 10, no or less frequent reminder messages may be generated. Moreover, if such an item is entered, the security application may not make an entry in the security log if such an item is not placed in the post-scan area 17. For example, the list of items in the exceptions database may include the specific product identification codes associated with types of gum, large bags of dog food, etc. Moreover, the list of item types in the exceptions database may include the department or item code associated all floral items, all candy items, or all greeting cards.

In addition, it should be appreciated that the self-service checkout terminal 10 may be configured to retrieve an expected weight value for each item that is scanned or otherwise entered from a weight database in response to entry of the item. For example, if the customer scans a can of soup, the self-service checkout terminal 10 may be configured to retrieve the expected weight value associated with the soup in response to entry thereof. Thereafter, if the item that the customer places in the post-scan area 17 possesses a weight value that does not match the retrieved expected weight value, the self-service checkout terminal 10 may be operated in a manner which reduces the likelihood that the customer commits an impropriety such as theft. For example, if the item that the customer places in the post-scan area 17 possesses a weight value that does not match the expected weight value of the item, the scanner 14 and any other item entry device associated with the self-service checkout terminal 10 are not re-enabled so as to suspend the customer's transaction until the weight discrepancy is resolved.

There are a plurality of advantages of the present invention arising from the various features of the self-service checkout terminal described herein. It will be noted that alternative embodiments of the self-service checkout terminal of the present invention may not include all of the features described yet still benefit from at least some of the advantages of such features. Those of ordinary skill in the art may readily devise their own implementations of a self-service checkout terminal that incorporate one or more of the features of the present invention and fall within the spirit and scope of the present invention as defined by the appended claims.

What is claimed is:

1. A method of operating a self-service checkout terminal, comprising the steps of:

generating an item-entered control signal when a user enters an item for purchase with a code entry device;

disabling said code entry device in response to generation of said item-entered control signal;

generating an item-not-detected control signal if said user does not place said item for purchase in a post-scan area within a first predetermined period of time subsequent to generation of said item-entered control signal; and enabling said code entry device in response to generation of said item-not-detected control signal.

2. The method of claim 1, further comprising the steps of:

generating an item-detected control signal if said user places said item for purchase in said post-scan area within said first predetermined period of time subsequent to generation of said item-entered control signal; and enabling said code entry device in response to generation of said item-detected control signal.

3. The method of claim 1, further comprising the steps of:

updating an electronic log value in response to generation of said item-not-detected control signal; and comparing said electronic log value to a log threshold and generating an intervention-needed control signal in response thereto if said electronic log value has a predetermined relationship with said log threshold.

4. The method of claim 1, further comprising the steps of:

generating a reminder-needed control signal if said user does not place said item for purchase in said post-scan area within a second predetermined period of time subsequent to generation of said item-entered control signal; and generating a message which instructs said user to place said item for purchase in said post-scan area in response to generation of said reminder-needed control signal.

5. The method of claim 4, wherein said second predetermined period of time is less than said first predetermined period of time.

6. The method of claim 1, wherein:

said code entry device includes a scanner device, said step of generating said item-entered control signal includes the step of generating said item-entered control signal when said user scans said item for purchase with said scanner device, said disabling step includes the step of disabling said scanner device in response to generation of said item-entered control signal, and said enabling step includes the step of enabling said scanner device in response to generation of said item-not-detected control signal.

7. The method of claim 1, wherein:

said self-service checkout terminal includes a weight scale positioned so as to detect placement of said item for purchase in said post-scan area of said self-service checkout terminal, and said step of generating said item-not-detected control signal includes the step of generating said item-not-detected control signal if said weight scale does not detect placement of said item for purchase in said post-scan area within said first predetermined period of time subsequent to generation of said item-entered control signal.

8. A method of operating a self-service checkout terminal having (i) a scanner device for allowing a user to enter an item for purchase, and (ii) a weight scale for detecting placement of said item for purchase in a post-scan area associated with said self-service checkout terminal, comprising the steps of:

generating an item-entered control signal when said user scans said item for purchase with said scanner device;

disabling said scanner device in response to generation of said item-entered control signal;

generating an item-not-detected control signal if said weight scale does not detect placement of said item for purchase in said post-scan area within a first predetermined period of time subsequent to generation of said item-entered control signal; and enabling said scanner device in response to generation of said item-not-detected control signal.

9. The method of claim 8, further comprising the steps of:

generating an item-detected control signal if said weight scale detects placement of said item for purchase in said post-scan area within said first predetermined period of time subsequent to generation of said item-entered control signal; and enabling said scanner device in response to generation of said item-detected control signal.

10. The method of claim 8, further comprising the steps of:

updating an electronic log value in response to generation of said item-not-detected control signal; and comparing said electronic log value to a log threshold and generating an intervention-needed control signal in response thereto if said electronic log value has a predetermined relationship with said log threshold.

11. The method of claim 8, further comprising the steps of:

generating a reminder-needed control signal if said weight scale does not detect placement of said item for purchase in said post-scan area within a second predetermined period of time subsequent to generation of said item-entered control signal; and generating a message which instructs said user to place said item for purchase in said post-scan area in response to generation of said reminder-needed control signal.

12. The method of claim 11, wherein said second predetermined period of time is less than said first predetermined period of time.

13. A self-service checkout terminal, comprising:

an entry device for allowing a user to enter an item for purchase;

an item sensor for detecting placement of said item for purchase in a post-scan area associated with said self-service checkout terminal;

a processing unit electrically coupled to both said code entry device and said item sensor; and a memory device electrically coupled to said processing unit, wherein said memory device has stored therein a plurality of instructions which, when executed by said processing unit, causes said processing unit to:

(a) generate an item-entered control signal when said user enters said item for purchase with said code entry device, (b) disable said code entry device in response to generation of said item-entered control signal, (c) generate an item-not-detected control signal if said item sensor does not detect placement of said item for purchase in said post-scan area within a first predetermined period of time subsequent to generation of said item-entered control signal, and (d) enable said code entry device in response to generation of said item-not-detected control signal.

14. The self-service checkout terminal of claim 13, wherein said plurality of instructions, when executed by said processing unit, further causes said processing unit to:

(a) generate an item-detected control signal if said item sensor detects placement of said item for purchase in said post-scan area within said first predetermined period of time subsequent to generation of said item-entered control signal, and (b) enable said code entry device in response to generation of said item-detected control signal.

15. The self-service checkout terminal of claim 13, wherein said plurality of instructions, when executed by said processing unit, further causes said processing unit to:

(a) update an electronic log value in response to generation of said item-not-detected control signal, and (b) compare said electronic log value to a log threshold and generating an intervention-needed control signal in response thereto if said electronic log value has a predetermined relationship with said log threshold.

16. The self-service checkout terminal of claim 13, wherein said plurality of instructions, when executed by said processing unit, further causes said processing unit to:

(a) generate a reminder-needed control signal if said item sensor does not detect placement of said item for purchase in said post-scan area within a second predetermined period of time subsequent to generation of said item-entered control signal, and (b) generate a message which instructs said user to place said item for purchase in said post-scan area in response to generation of said reminder-needed control signal.

17. The self-service checkout terminal of claim 16, wherein said second predetermined period of time is less than said first predetermined period of time.

18. The self-service checkout terminal of claim 13, wherein:

said code entry device includes a scanner device, and said plurality of instructions, when executed by said processing unit, further causes said processing unit to:

(a) generate said item-entered control signal when said user scans said item for purchase with said scanner device, (b) disable said scanner device in response to generation of said item-entered control signal, and (c) enable said scanner device in response to generation of said item-not-detected control signal.

19. The self-service checkout terminal of claim 13, wherein:

said item sensor includes a weight scale, and said plurality of instructions, when executed by said processing unit, further causes said processing unit to generate said item-not-detected control signal if said weight scale does not detect placement of said item for purchase in said post-scan area within said first predetermined period of time subsequent to generation of said item-entered control signal.

* * * * *